Patented Oct. 27, 1953

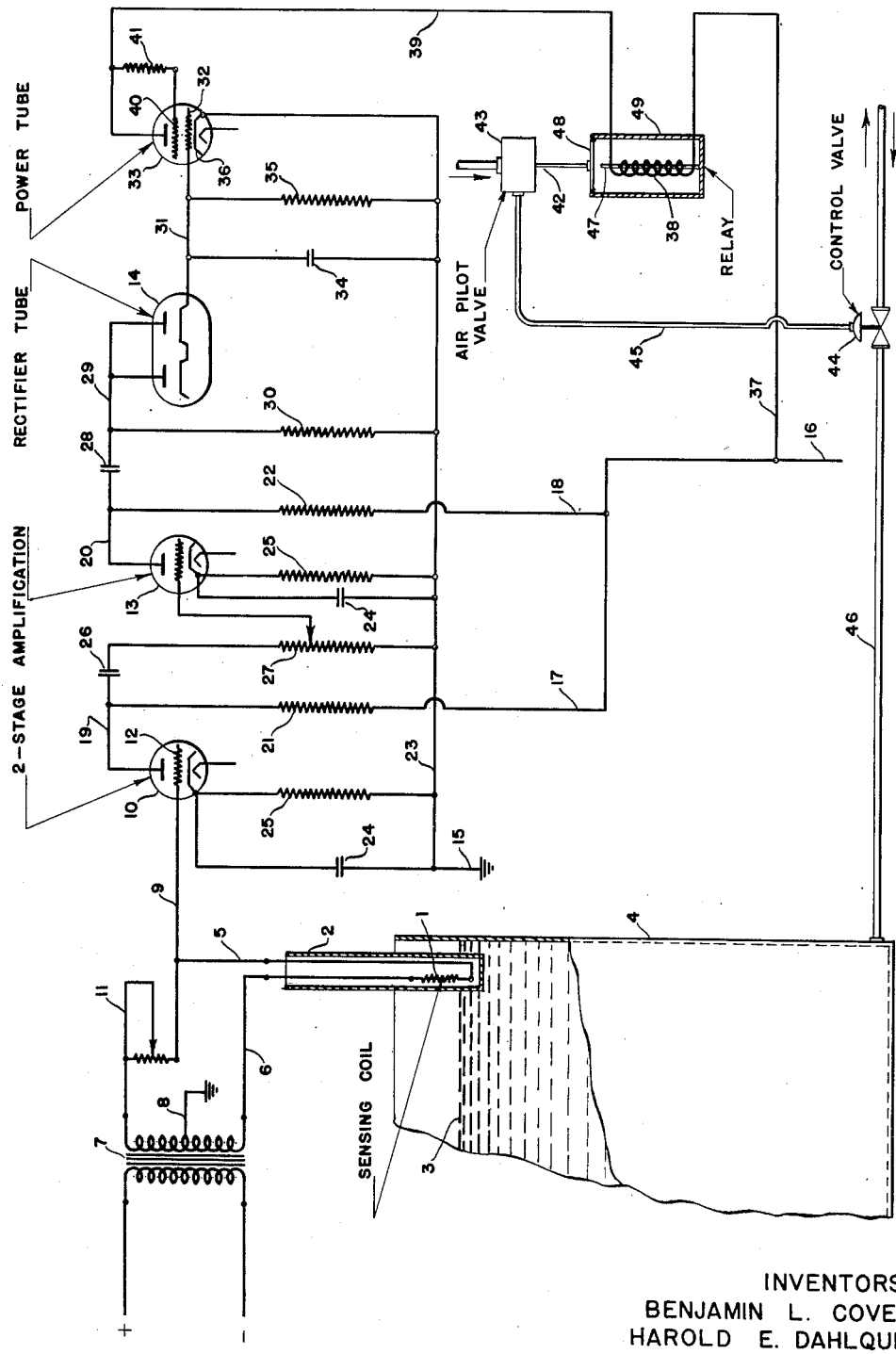

2,657,341

UNITED STATES PATENT OFFICE 2,657,341

LIQUID LEVEL CONTROL APPARATUS

Benjamin L. Covert and Harold E. Dahlquist, Chicago, Ill., assignors to Universal Oil Products Company, Chicago, Ill., a corporation of Delaware Application July 29, 1950, Serial No. 176,568

3 Claims. (Cl. 317—132)

1

This invention relates to an improved type of electronic liquid level control apparatus, and more particularly to a relatively simple electronic type of controller which may be utilized to maintain substantially accurate liquid levels, within small liquid receiving chambers.

Many of the present forms of liquid level controllers are of a type which are not suitable for use with very small liquid receiving chambers, such as may be used in laboratory apparatus or pilot plants, or they are not adapted for use with extremely high pressure equipment because of inadequate packing glands or sealing means. Still other types of liquid level controllers are adapted to operate over a relatively wide range of level variations and are not sensitive to small changes in liquid level.

It is, therefore, a principal object of the present invention to provide a sensitive type of liquid level controller which is adapted to operate quickly and accurately within small liquid receiving chambers without too much hold-up of the liquid material.

It is a further object of the present invention to provide a control instrument which is of the electronic type adapted to operate in connection with small liquid flows at high pressure, and utilizing a resistance coil sensing element connecting with a balancing resistor and a transformer in a resistance phase changing circuit, whereby resulting voltage changes operate a relay and pilot valve.

It is a still further object of the improved instrument to provide a control apparatus which may be utilized in connection with either large or small liquid receiving chambers and may be constructed and operated in a relatively inexpensive manner.

Briefly, the improved electronic liquid level control apparatus of this invention comprises in combination, an electrical resistance sensing coil adapted to be positioned within a receiving chamber at a desired liquid level therein, wiring connecting the sensing coil with one end of a secondary coil of a transformer and one end of a balancing resistor, the latter connecting to the other end of the secondary coil and the secondary coil having a grounded center tap whereby changes in resistance from the sensing coil effect changes in the voltage output from the secondary coil, wiring connecting one end of the sensing coil and the accompanying end of the balancing resistor to a control grid of a first stage amplifying tube in an electronic amplifying and rectifying circuit, means connecting a rectified voltage from the latter circuit to the control grid of a power tube, a direct current power supply to the anodes of each of the tubes of the circuits, an electrical relay connected in the direct current power suply line to the anode of the power tube, whereby the relay may operate a pilot valve connecting therewith, the pilot valve in turn connecting with and operating an automatic liquid flow control valve in a fluid conduit communicating with the liquid receiving chamber. The relay and pilot valve are connected in a manner to be responsive to direct current flow to the anode of the power tube, and the direct current flow in turn is regulated and controlled by a resulting voltage applied to the control grid of the power tube from the rectified phase output of the secondary coil of the transformer which is initiated by the sensing coil.

Preferably the sensing element, or resistance coil, conecting with the secondary transformer, is mounted within the liquid receiving chamber so that it is just above the liquid level desired within the chamber and out of contact with the liquid for a balancing of the electronic circuit. In other words, the circuit is arranged so that when the sensing element is out of liquid there is a phase balance, with no voltage flowing from the output of the secondary coil of the transformer. Thus, when the liquid level changes and reaches the sensing element there is a resistance change which in turn provides a phase output from the transformer coil. The voltage of this phase output is then rectified and supplied to the control grid of the power tube. A current flow from the control grid of the power tube then operates to cut off current flow to the anode or plate thereof and in turn effect a release of an armature of a relay which is placed adjacent a pilot control valve. Preferably an air pilot valve is utilized which is sensitive to any changes in the pressure, or back pressure, exerted against a pilot air stream, so that the pilot valve may operate an automatic air or motor controlled valve within a fluid conduit to the liquid receiving chamber, to in turn control fluid flow to, or away from, the chamber and maintain a desired liquid level.

The construction and operation of the improved electronic liquid level control apparatus will be more apparent upon reference to the accompanying drawing and the following description thereof, while in addition, further advantages of the improved apparatus will be noted in connection therewith.

Referring now to the drawing, there is indicated diagrammatically a sensing coil 1 within a protecting sleeve or well 2 and mounted at a desired liquid level 3 within a liquid receiving chamber 4. The resistance coil 1 may be of nickle, or other suitable wire, and wound in the form of a heating coil, while the sleeve or well 2 may be of tubular form with a closed lower end so that it may protect the resistance coil from direct contact with the liquid medium in the chamber. Stainless steel or other alloy may be desirable where corrosive materials are handled in the liquid receiving chamber 4.

The resistance coil 1 connects by means of wire 5 to a balancing resistor 11 by wire 6 to the end of the secondary coil of a transformer 7, the latter being supplied with a suitable substantially constant voltage alternating current. The center tap of the secondary coil of transformer 7 is grounded by a suitable wire 8, so that opposing phase circuits are provided from ground to line 5 and line 9 which connects with the grid of a first stage amplifying tube 10, of an amplifying and rectifying circuit.

In a preferred arrangement, the sensing coil 1 is positioned such that it is just above a desired liquid level within the chamber 4 and is joined with the transformer 7 in a resistance phase changing circuit so that when the element is out of the liquid there is a phase balance within the circuit and no voltage flows from the output of the secondary coil of the transformer. The balancing resistance 11 in the control circuit maintains the output balance so that no voltage flows under this condition. However, when a liquid level 3 within the chamber 4 reaches the element, there is a resistance change due to a change in temperature of the sensing coil so that there is a change in phase output from the transformer 7. The resulting voltage from the phase output is carried through a two-stage amplification circuit and a rectifying circuit to thus provide a higher direct current voltage at a power control tube.

The amplifying and rectifying circuits, having the amplifying tubes 10 and 13 and a rectifying tube 14, receive suitable anode power by way of a direct current source connecting to lines 15 and 16. Lines 17 and 18, and the respective plate resistances 21 and 22, connect with the lines 19 and 20, which in turn connect with the respective anodes of amplifying tubes 10 and 13. The ground lines 15 and 23 connect through suitable by-pass condensers 24 and bias resistances 25 to the cathodes of each of the amplifying tubes 10 and 13. Line 19 connects with a suitable coupling condenser 26 and the latter connects with a suitable adjustable gain control resistance 27 which is placed from condenser 26 to ground line 23. The adjustable tap of the gain control 27 connects directly with the grid of amplifying tube 13, such that the amplifying circuit may be properly controlled. The phase output from the amplifying circuit carries by way of line 20 and the coupling condenser 28 through line 29 to the anodes of the rectifying tube 14. A load resistance 30 also connects between ground line 23 and the anode line 29.

A resulting rectified direct current voltage from the cathode of rectifying tube 14 passes by way of line 31 to the control grid 32 of a power control tube 33. A filter condenser 34 and a load resistance 35 connect between line 23 and line 31, the latter connecting with the control grid of the power tube 33, while the ground line 23 connects directly with the cathode 36 of the power tube. Direct current anode power for the tube 33 is carried by way of lines 16 and 37, relay coil 38, and line 39 directly to the anode of the power tube. The screen grid 40 also receives power by way of line 39 and resistance 41.

The relay coil 38 is, in the present electronic system, wound around a suitable iron core 47 which is adjacent a movable armature 48 at the end of a relay box 49. Thus, in operation, when there is no voltage flow to the control grid 32 of the power tube 33, then direct current flows through the anode circuit of the power tube, passing by way of line 37 and coil 38 and line 39 directly to the anode of the tube. With current flow through the relay coil 38, the core 47 is energized and the movable armature 48 is pulled away from the air nozzle 42 actuating an air pilot valve 43 which tends to open, or alternatively, close a diaphragm or motor control valve 44 by means of air line 45. The control valve 44 in turn is placed within a fluid conduit 46 which communicates with the liquid receiving chamber 4 so that fluid flow to, or from, the chamber may be controlled to maintain the given desired liquid level within the retaining chamber.

When the sensing coil 1 of the liquid level controlling apparatus changes resistance so as to effect a phase change, the output voltage is amplified and rectified so that a resulting D. C. voltage passes to the control grid 32 of power tube 33. With this voltage flow to the control grid, the current flow through the power tube is cut off and the result is that there is no voltage flow through the relay coil 38 and the air pilot valve 43 is actuated by the armature 48 stopping the flow of air from the nozzle 42. As previously noted, the amplifying and rectifying circuit of the apparatus is preferably balanced when the liquid level 3 is out of contact with the sensing coil 1 and the enclosing sleeve or well 2, with opposing phases of the secondary coil balancing one another and a current flow effected only when there is a change in resistance at the sensing coil 1 and a resulting voltage phase output from liquid coming in contact with a lower end of the well 2. Thus, when there is no flow to the control grid 32 of the power tube 33, anode power is continuously supplied thereto and air pilot valve 33 is maintained in an open position by means of the relay armature 48 and nozzle 42. The air pilot valve being in turn connected with control valve 44, such that air is passed by way of line or tube 45 to the diaphragm of the control valve 44 and fluid flow effected either to or from the chamber 4. Where there is fluid flow through the valve 44 and conduit 46 to the liquid receiving chamber 4 for an energized relay and no current to the control grid 32, then a resulting liquid level contact with the sensing coil 1 effects a voltage flow to control grid 32 and a cutting off of the current flow through the anode circuit of the power tube 33 which in turn effect a cutting off of the fluid supply through the control valve 44 and to the chamber 4.

The control apparatus may of course be connected or hooked-up such that the air pilot valve 43 opens the control valve 44 when there is a voltage output from a sensing coil and a release of the relay coil 38, to allow fluid flow away from the chamber 4. In this alternative arrangement, a voltage output from the sensing coil may operate control grid 32 to cut off the voltage to the anode of the power tube and current flow through relay 38 such that the air pilot valve may open the control valve 44 and allow flow through the conduit 46 away from liquid receiving chamber 4 to in turn effect a lowering of the liquid level 3. Fluid in this instance being supplied through a fluid inlet conduit connecting with chamber 4 and not shown in the present drawing.

This improved electronic control system is of particular advantage in that it is not subject to pressure changes within the liquid receiving chamber 4 and it is unnecessary to have any type of packing glands or sealing means around mechanically moving parts. An electrical resistance coil of the type used in electronic circuit of this apparatus is also particularly sensitive to small changes in temperature and thus acts to issue a voltage output or phase change from the secondary coil of transformer 7 immediately upon being contacted with liquid level 3, to in turn provide a sensitive type of level controlling apparatus which does not permit a wide range in variation of the liquid level 3. This present liquid level controlling apparatus has an advantage over the float type of level controls, where it is necessary to have a relatively large chamber to accommodate a movable float.

The resistance coil 1 and protecting sleeve or well 2 may be readily inserted in small vessels or chambers such as may be used in laboratory or pilot plants as well as in connection with large commercial size plants or installations, and is of course immediately sensitive to any liquid contact therewith. Apparatus of this type may be used advantageously with small fluid flows of the order of 100 cubic centimeters per hour or less, with either atmospheric or high superatmospheric pressures being utilized within the liquid receiving chamber itself.

We claim as our invention:

1. An electronic liquid level control apparatus comprising a sensing coil, wiring connecting one end of said sensing coil with a balancing resistor, and wiring connecting the other end of said sensing coil and of said resistor with each end of a secondary coil of a transformer, said secondary coil having a grounded center tap whereby changes in resistance from said sensing coil change the voltage output from said transformer secondary coil, wiring connecting one end of said sensing coil and the accompanying end of said balancing resistor to the control grid of a first stage amplifying tube in an electronic amplifying and rectifying circuit, means connecting a rectified voltage from said circuit to the control grid of a power tube, a direct current power supply to the anodes of each of the tubes of said circuits, and an electro-magnetically controlled deflecting member connected in the direct current power supply line to the anode of the power tube, and with said deflecting member moving substantially linearly responsive to the current in the anode circuit of said power tube.

2. An electronic liquid level control apparatus comprising a resistance coil sensing element having a protecting sleeve precluding the latter coming into direct contact with a liquid medium, wiring connecting said sensing element with one end of a secondary coil of a transformer and one end of balancing resistor, said resistor connecting to the other end of said secondary coil, and said transformer receiving a constant voltage alteranting current and having a grounded center tap whereby changes in temperature and resistance from said sensing element change the voltage output from said secondary coil of said transformer, wiring connecting one end of said sensing element and the accompanying end of said balancing resistor to the grid of a first stage amplifying tube in an electronic amplification circuit, additional wiring and suitable isolating condensers and resistances therein connecting the amplification circuit to a rectifying tube in a rectificaton circuit, the resulting rectified voltage output from said rectifying tube connecting to the control grid of a power tube, a direct current power supply to the anodes of the tubes of said amplification and rectification circuits, and a direct current power supply line to the anode of said power tube with an an electro-magnetically controlled deflecting member connected in series therein and moving in a substantially linear manner responsive to current flow to the anode of said power tube, whereby flow control means may be regulated directly responsive to said resistance coil sensing elements.

3. The electronic liquid level control apparatus of claim 2 further characterized in that said secondary coil of the transformer and said circuits are balanced such that there is no voltage output from said transformer when said sensing element is out of contact with liquid, whereby direct current is supplied to the anode of said power tube through said relay, and a resulting change in resistance from said sensing element supplies the voltage to the controlling grid of said power tube and cuts off the current flow to the anode of said power tube.

BENJAMIN L. COVERT.
HAROLD E. DAHLQUIST.

References Cited in the file of this patent
UNITED STATES PATENTS

| Number | Name | Date |
|---|---|---|
| 2,150,440 | Hargreaves | Mar. 14, 1939 |
| 2,228,163 | Cohen | Jan. 7, 1941 |
| 2,310,298 | Kuhl | Feb. 9, 1943 |
| 2,323,128 | Hare | June 29, 1943 |
| 2,456,233 | Wolf | Dec. 14, 1948 |
| 2,457,165 | McNamee | Dec. 28, 1948 |
| 2,550,430 | Schwarz | Apr. 24, 1951 |